United States Patent
Butler et al.

(10) Patent No.: US 7,571,038 B2
(45) Date of Patent: Aug. 4, 2009

(54) IN-VEHICLE MULTIMEDIA SYSTEM

(75) Inventors: Nick Butler, Rochford (GB); Jean-Noel Batour, Essex (GB); Dax Tucker, London (GB); Michael John Fey, Essex (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 576 days.

(21) Appl. No.: 11/358,848

(22) Filed: Feb. 21, 2006

(65) Prior Publication Data

US 2006/0212197 A1 Sep. 21, 2006

(30) Foreign Application Priority Data

Feb. 18, 2005 (GB) ................................ 0503370.9

(51) Int. Cl.
*G06F 7/00* (2006.01)

(52) U.S. Cl. .............................. 701/36; 701/1; 701/33; 340/439; 340/461; 340/995.17

(58) Field of Classification Search ...................... 701/1, 701/28, 33, 36, 207–211; 340/425.5, 438, 340/439, 461, 815.41, 995.17, 995.26
See application file for complete search history.

(56) References Cited

U.S. PATENT DOCUMENTS

| 6,672,479 B2 | 1/2004 | Shiraishi et al. |
| 6,995,755 B2 | 2/2006 | Yamaguchi et al. |
| 2005/0154505 A1* | 7/2005 | Nakamura et al. ............. 701/1 |

FOREIGN PATENT DOCUMENTS

| DE | 10224648 | 12/2003 |
| WO | WO2005/016697 | 2/2005 |

* cited by examiner

*Primary Examiner*—Gertrude Arthur Jeanglaud
(74) *Attorney, Agent, or Firm*—Brinks Hofer Gilson & Lione (57) ABSTRACT

The present invention relates to a rear seat multimedia system within a motor vehicle. A display is movable between a position in which the display extends downwardly from the headliner so as to be viewable by a rear seat passenger, and a retracted position against the headliner. A motor is provided for moving the display, at least from the extended position to the retracted position. The vehicle has a sensor for sensing when the vehicle is to be driven in reverse, and the display unit is operatively linked to this sensor. When the display is extended and the reversing condition is sensed, the display is automatically moved to the retracted position to improve rearward visibility for the driver.

20 Claims, 4 Drawing Sheets

IN-VEHICLE MULTIMEDIA SYSTEM

BACKGROUND

1. Field of the Invention

The present invention relates to a passenger display unit for a multimedia system within a motor vehicle.

2. Related Art

In-vehicle multimedia entertainment systems having a display unit incorporating a flat panel display are becoming increasingly popular. Usually, multimedia entertainment systems are provided having displays that are visible only to rear seat passengers, or at least out of view of the driver. One location for such displays is in the rear surface of a front seat headrest. This location provides the benefit that the display is roughly at eye level for a rear seat passenger. However, it is normally the case that two such displays will have to be provided, one in each of the front seat headrests. Although this does provide the option of allowing different rear seat passengers to enjoy different multimedia programs, music or games, this also entails the provision of two display units, associated wiring looms, and possibly two separate control panels, remote controls and multimedia sources. Furthermore, if the vehicle has more than one row of rear passenger seats, it may be necessary to provide yet more of such hardware for the additional row of seats.

An alternative is to provide a display unit mounted in a central location of the headliner. In this position the display panel can be viewed by the rear seat passengers. If the vehicle has more than one row of rear seats, then, optionally, there may be two such display units provided at convenient central locations, one for each of the rows. A disadvantage of this system, however, is the potential interference with headroom in the vehicle, both in terms of rear seat passenger access and visual obstruction to the driver.

SUMMARY

It is an object of the present invention to provide a more convenient multimedia system within a motor vehicle.

Accordingly, in one embodiment the invention provides a motor vehicle having a rear seat multimedia system, the system having a display unit mounted on a central portion of a passenger compartment headliner and a display. The display is movable between an extended position, in which the display extends downwardly from the headliner so that the display is viewable by one or more rear seat passengers, and a retracted position in which, the display is retracted upwards towards the headliner and in which the display is not viewable by the passengers. The display unit connected to a motor for moving the display at least from the extended position to the retracted position. In one embodiment, the vehicle includes a reversing sensor for sensing a reversing condition when the vehicle is to be driven in reverse. In this embodiment, the display unit is operatively linked to the sensor so that, when the display is extended and the reversing condition is sensed, the motor automatically moves the display to the retracted position. The display is therefore automatically retracted in order to improve the rear view afforded the driver during reversing, either via a rear view mirror, or directly over the shoulder.

The display is preferably a flat panel display, for example an LCD flat panel display. The vehicle may include a gear selector with a reverse gear setting. The sensor is then arranged to sense the setting of the gear selector. The display unit may include a processor that receives a signal from the reversing sensor and that is arranged to control the operation of the motor in response to the signal.

In one embodiment of the invention, the multimedia system is arranged to send a "pause play" command to a multimedia source when the display is to be retracted in response to the sensed reversing condition. Thus, although the retraction of the display will interrupt the entertainment provided to passengers, the multimedia content is only paused, and can be resumed when it is again possible to use the display unit. The term "pause" is distinguished from "stop" in that a paused multimedia source can be resumed from the place in the multimedia content at which the source was originally paused. In some systems, a last position memory function may be built in to the multimedia device, so that if a stop command is sent to the device, a later "resume" command will permit the device to continue play from the last stopped position. In this sense, a stop command can be made equivalent to a pause command, when the stop command is combined with a last position memory function and a later resume command.

There may be a multimedia source integrally provided with the multimedia system. However, it may alternatively be that the multimedia source is separate from the multimedia system. The source and system are then linked together by a bidirectional communications link, which may be electrical, free-air optical, fiber optic or wireless. The multimedia system then sends the pause play command to the multimedia source over the communications link.

The sensor may also be arranged to sense when a reversing condition no longer exists. In such a case, when the display has previously been retracted in response to a reversing condition, the motor then automatically moves the display to the extended position, so that normal viewing of the display may be resumed. When the reversing condition no longer exists, the multimedia system may further be arranged to send a "resume play" command to the multimedia source. Especially when it is the case that the multimedia source has previously been paused in response to the sensed reversing condition.

The multimedia system may alternatively include a separate multimedia source, the multimedia system being linked to the multimedia source by means of a bidirectional communications link. The multimedia system sends its various commands, such as the resume play command, to the multimedia source over said communications link.

Alternatively, the vehicle may include a "key off" sensor for sensing a key off condition. In this case, the display unit may be operatively linked to the key off sensor so that when the display is extended and the key off condition is sensed the motor automatically moves the display to the retracted position. In this regard, it should be noted that the vehicle will have a start/run control that can be any sort of key, whether a mechanical device, or an electronic or optoelectronic device that functions as key to enable the vehicle to be started, and may include, for example push-button controls or a start button. All such devices are referred to herein as a start/run control, with an associated sensor and an off setting referred to respectively as a "key off" sensor and as a "key off" setting.

The multimedia system may alternatively include a user input device. This can be any type of input device for controlling the multimedia system, for example a key pad on a display housing and/or an infra-red remote control. The display unit can be operatively linked to the key off sensor so that when key off is sensed, the multimedia system presents to a user of the multimedia unit a message. The message may be, for example on the display or audibly via loudspeakers or headphones, and essentially asks in one way or another if the user wishes to continue using the multimedia unit. The multimedia system is then arranged in response to user input via the user input device in the affirmative to automatically continue use during the key off condition. Otherwise, the multimedia system may automatically power down after a predetermined time, for example 10 seconds. To conserve battery power, it is preferred if such automatically continued use during the key off condition is further limited to a predetermined period of time, for example one hour.

Alternatively, the multimedia system may be arranged in response to user input in the negative to present to a user of the multimedia unit a message asking of the user wishes to pause a multimedia source. In the event of an answer in the affirmative from the user input device, the multimedia system is arranged to send a pause play command to the multimedia source or, equivalently, so store in memory a last location or stage of the multimedia content. In this way play or viewing can be resumed later from the same or a proximate location in the content.

Also according to the invention, there is provided a motor vehicle, comprising a number of driver controls. Each control has a setting used by a driver to drive the vehicle, at least one sensor for sensing at least one driver selection and a passenger multimedia system having a display for at least one passenger. The functionality of the multimedia system when being used by a passenger is responsive to the sensed driver selections(s).

The term "functionality" as used here does not include switching off fully the multimedia content, but requires that the multimedia system continues, even after a pause or delay, to provide a multimedia content to a user. For example, if the user is watching an on-air television program, and the display has to be temporarily retracted or raised in order to provide a better view for the driver when reversing, the audio aspect of the television program may still be provided to the user while the visual display is temporarily interrupted. Another example of the functionality being responsive to the sensed driver selection would be pausing of a recorded video program or video game while the display is temporarily retracted or raised during vehicle reversing. Therefore, the functionality may include an automatic pause in use of the multimedia system by a passenger in response to the sensed driver selection(s). The functionality may include after the automatic pause, an automatic resume in use of the multimedia system by a passenger in response to a reversion in the sensed driver selection(s).

The driver control may be a gear selector having a reversing sensor for sensing a reversing condition when the vehicle is to be driven in reverse. The motor is then operatively linked to the reversing sensor so that when the headliner mounted display is extended and the reversing condition is sensed, the motor automatically moves the display to the retracted position.

The driver control may alternatively be a motor start/run control having a key off sensor for sensing a key off condition when the vehicle motor is to be switched off. The display motor is then operatively linked to the key off sensor so that when the display is extended and the reversing condition is sensed the motor automatically moves the display to the retracted position.

Also according to the invention, there is provided a method of operating a rear seat multimedia system in a motor vehicle. The method including the steps of:

positioning the display so that it would be visible to a passenger of the vehicle;

presenting multimedia content on the display;

using the reversing sensor to sense a reversing condition when the vehicle is to be driven in reverse; and providing an output derived from the reversing sensor to the multimedia system so that the motor automatically moves the display closer to the headliner in order to improve the rear view afforded the driver of the vehicle either directly or in a rear view mirror of the vehicle.

Alternatively, the invention provides a method of operating a passenger multimedia system in a motor vehicle in which the method includes the steps of:

presenting multimedia content on the display;

using driver controls to control the road operation of the vehicle;

using at least one driver control sensor to sense at least one driver selection of the driver controls; and providing an output derived from the at least one sensor to the multimedia system in order to automatically control the way in which at least a video aspect of the multimedia content is presented to a passenger of the vehicle. In this method, it is preferred that the display be movable, the method then comprising the step of initially positioning the display so that this would be visible to a passenger of the vehicle.

As used herein the term "passenger-only" display units excludes displays which are visible to the driver of the vehicle, but includes displays that are visible to front or rear seat passengers.

BRIEF DESCRIPTION OF THE DRAWINGS

The invention will now be further described, by way of example only, and with reference to the accompanying drawings, in which.

DETAILED DESCRIPTION

Figure 1:
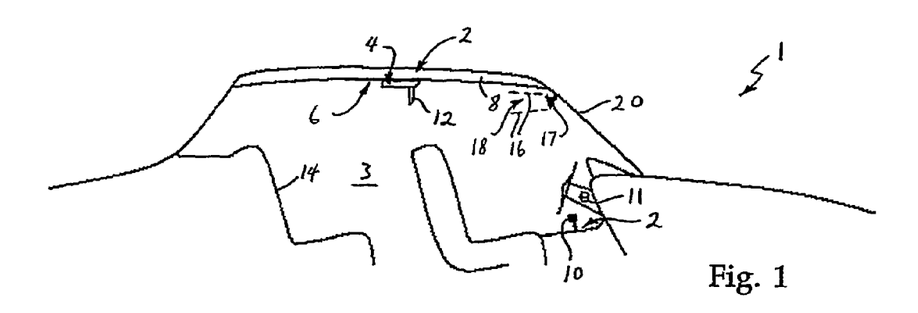
FIG. 1 is a schematic sectional view through a motor vehicle having a rear seat multimedia system according to a preferred embodiment of the invention, the system having a display unit that is mounted on a central portion of a passenger compartment headliner and that is linked to a number of driver controls by which a driver may drive the vehicle.

FIG. 1 shows a schematic sectional view through a motor vehicle 1 that comprises and inside passenger compartment 3 having a rear seat multimedia system 2 with a display unit 4 mounted on a central portion 6 of a passenger compartment headliner 8 and which is linked to a number of driver controls, including a gear lever or selector 10 by which a driver may drive a vehicle 1, and an ignition key switch 11. Because of the location of the display unit 4, a flip-down display 12, when extended downwardly as shown in FIG. 1, can be conveniently viewed by one or more occupants of rear seats 14.

Figure 2:
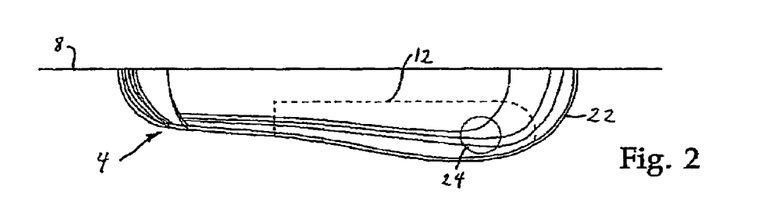
FIG. 2 is a side view of the display unit of FIG. 1, showing in dashed outline a flip-down display concealed within the unit.
Figure 3:
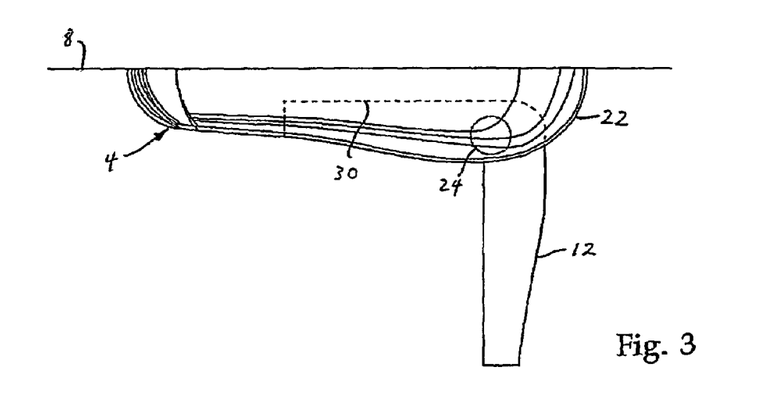
FIG. 3 is a side view similar to that of FIG. 2, showing the display extending downwardly from the headliner.

FIGS. 2 and 3 are close up side views the display unit 4, showing respectively the display 12 flipped up and concealed within a display housing 22, and then flipped down to extend away from the headliner 8.

Figure 4:
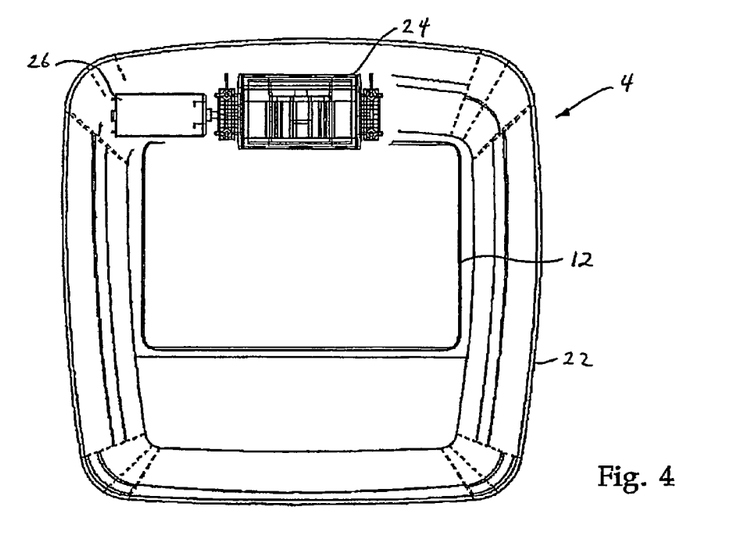
FIG. 4 is a plan view from underneath the display unit of FIG. 2, partially cut away to show a motor and hinge mechanism by which the display flips down.
Figure 5:
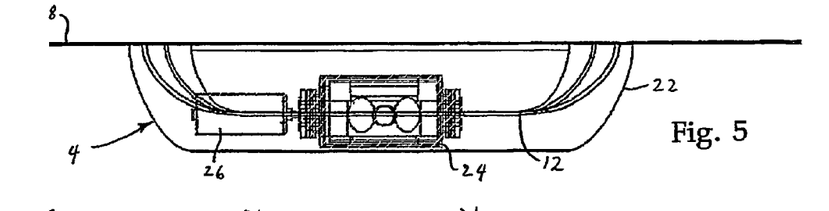
FIG. 5 is an end view of the display unit of FIG. 4, showing in phantom the motor and hinge mechanism.
Figure 6:
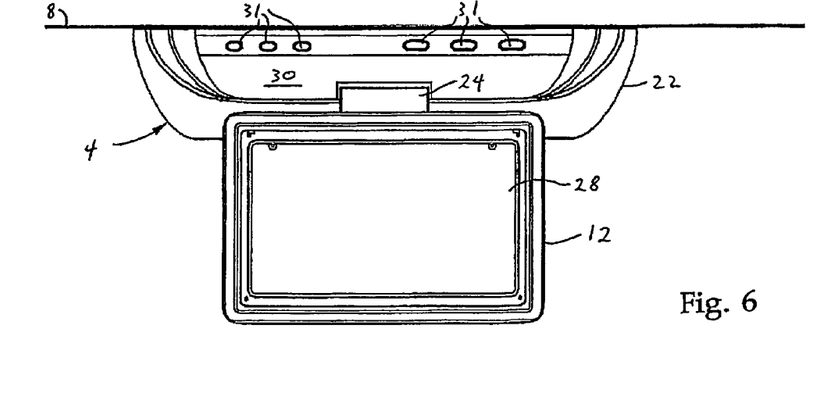
FIG. 6 is an end view similar to that of FIG. 5, showing the display extending downwardly from the headliner.

As shown in FIGS. 4 and 5, the display pivots about a hinge mechanism 24 that is driven by a small electric motor 26. As shown in FIG. 6, the display includes a flat pane display device 28 such as a color LCD panel. The flat panel display 28 faces rearwards in the passenger compartment, angled generally perpendicularly downwards, and rotates (forward relative to the viewing surface of the screen, rearward relative to the orientation of the vehicle 1) upwards, as this rotate through about 90°, into a matching recess 30 inside the display unit housing 22.

Control buttons 31 may be provided on the display unit itself, either within the recess 30 as drawn or externally elsewhere on the display housing 22.

Although the location of the display 12 is convenient for the rear seat passenger, the display 12 may obstruct, at least partially, a rear view 16 afforded a driver by a rear view mirror 17, which is also conventionally mounted centrally in a forwards portion 18 of the passenger compartment 3, for example on a front window 20. In this example, the flip-down display 12 is relatively small compared with the field of view 16, but when performing certain maneuvers, particularly reversing, it is highly desirable to maximize the rear view 16 afforded the driver.

Figure 7:
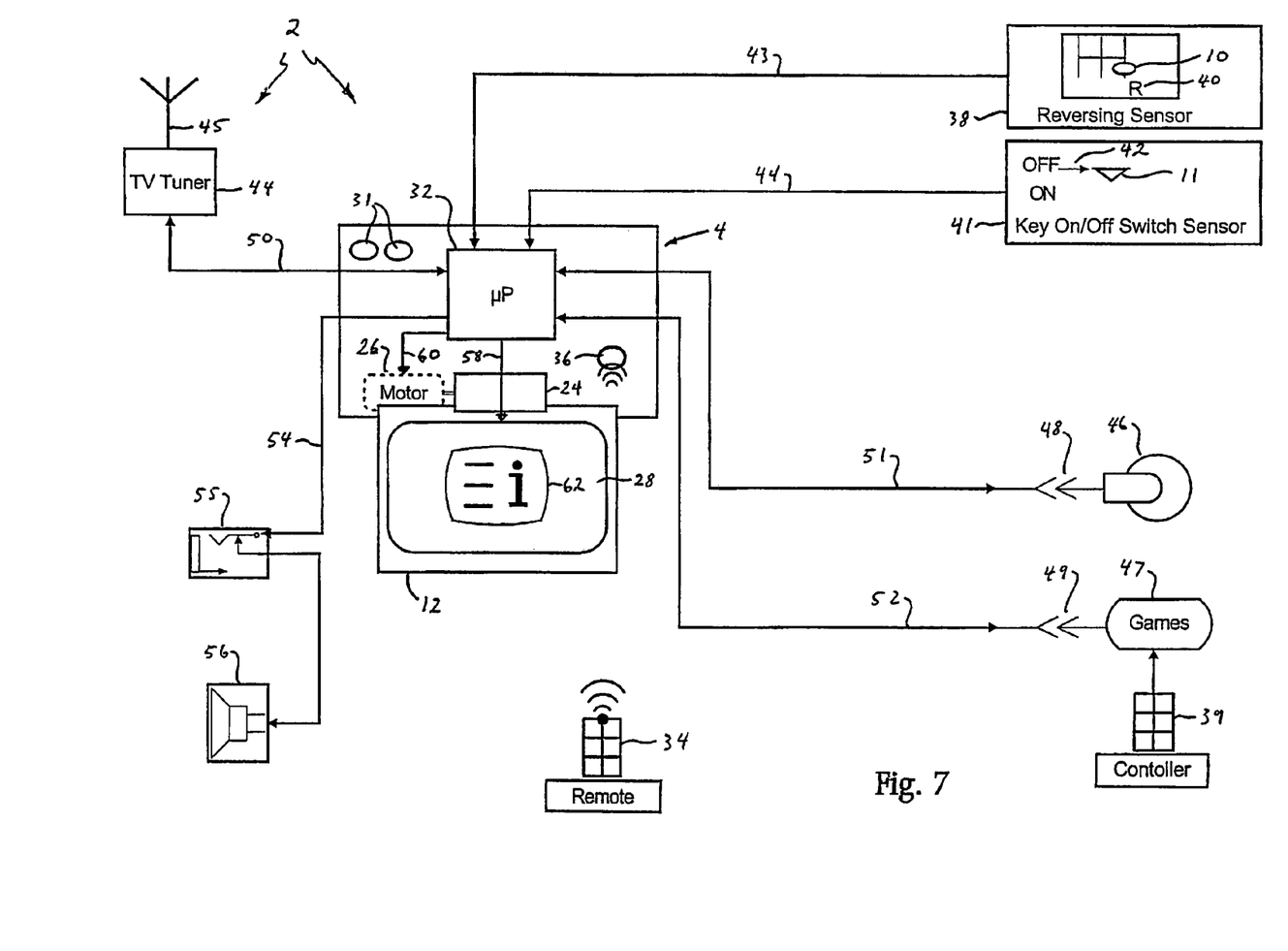
FIG. 7 is a schematic diagram showing in more detail various components of a preferred embodiment of the multimedia system.

FIG. 7 is a schematic diagram showing in more detail various components of the multimedia system 2. The system includes control electronics and associated software or firmware. In FIG. 7 this is represented for convenience by a microprocessor 32, but of course the person skilled in the art will appreciate that the control electronics may comprise several such microprocessors or other discrete electrical components, which may be provided within the display unit display unit 4 or elsewhere in the vehicle 1. The microprocessor 32 controls the operation of the display 12 and the motor 26, for example via the control buttons 31 or by means of an infra-red remote control 34 and a receiver 36 on or in the housing 22.

The microprocessor 32 is connected to a reversing sensor 38 that is arranged to sense when the vehicle 1, through a gear selector such as the gear lever 10, has been placed in reverse gear 40, and is also connected to a key on/off sensor 41, which is arranged to sense when the ignition switch 11 has been switched off 42. The microprocessor 32 receives corresponding signals 43, 44 from the reversing and key on/off sensors 40, 42 that indicate the positions of the gear lever 10 and the ignition switch 11.

The microprocessor 32 is also connected to at least one multimedia source, for example a TV tuner 44 that is integrated with the vehicle 1 and which has an external aerial 45, a CD/DVD player 46, and a games console 47 which will normally include a handset controller 39. The CD/DVD player 46 and games console 47 may be portable units that are connected to the display unit via suitable connectors 48, 49.

Respective bidirectional connections to the TV tuner 44 CD/DVD play 46 and games console 47 permit the display unit to send and receive signals 50, 51, 52 to these multimedia sources.

The microprocessor 32 provides an audio output signal 54 derived from a multimedia source 44, 46, 47 to present the audio aspect of multimedia content on one or more speakers 56, for example via a headphone jack 55 which disconnects the speakers 56 when a headphone (not illustrated) is plugged into the jack 55. The microprocessor 32 also provides a video signal 58 derived from a multimedia source 44, 46, 47 to present on the flat panel display 28 the video aspect of the multimedia content.

When the microprocessor 32 receives a signal 43 from the reversing sensor indicating that the reverse gear 40 has been selected, then in one embodiment of the invention, the microprocessor 32 automatically sends a control signal 60 to the motor 26 to retract the display 12 in order to give the driver a better field of view 16. Where the multimedia source can be paused, as in the case of the CD/DVD player 46 or the games console 47, then the microprocessor 32 also sends a pause command to the source to pause the multimedia program.

When the gear selection moves out of reverse 40, this is also registered by the microprocessor 32, which then sends a signal 60 to the motor 26 to extend the display 28, whereupon the microprocessor 32 sends a resume command to the source so that rear seat viewers can resume viewing of the multimedia program.

In a further embodiment of the invention, when the microprocessor 32 receives a signal 44 from the key on/off sensor indicating that the ignition switch 11 has been switched off 42, then the microprocessor 32 automatically sends a video signal 58 to the flat panel display 28 to present to viewers of the multimedia program a question or a prompt 62 to find out if the multimedia program should be continued. Viewers may then enter an affirmative or a negative answer, for example by means of the front panel buttons 31, the remote control 34 or by means of control buttons on the multimedia source 46, 47. If no affirmative response is received by the microprocessor 32 within a predetermined time period, then the microprocessor 32 automatically switches off preferably the entire multimedia system 2 to conserve power. If an affirmative answer is received in time, then the microprocessor 32 allows continued enjoyment of the multimedia program for a predetermined time period, for example one hour.

Figure 8:
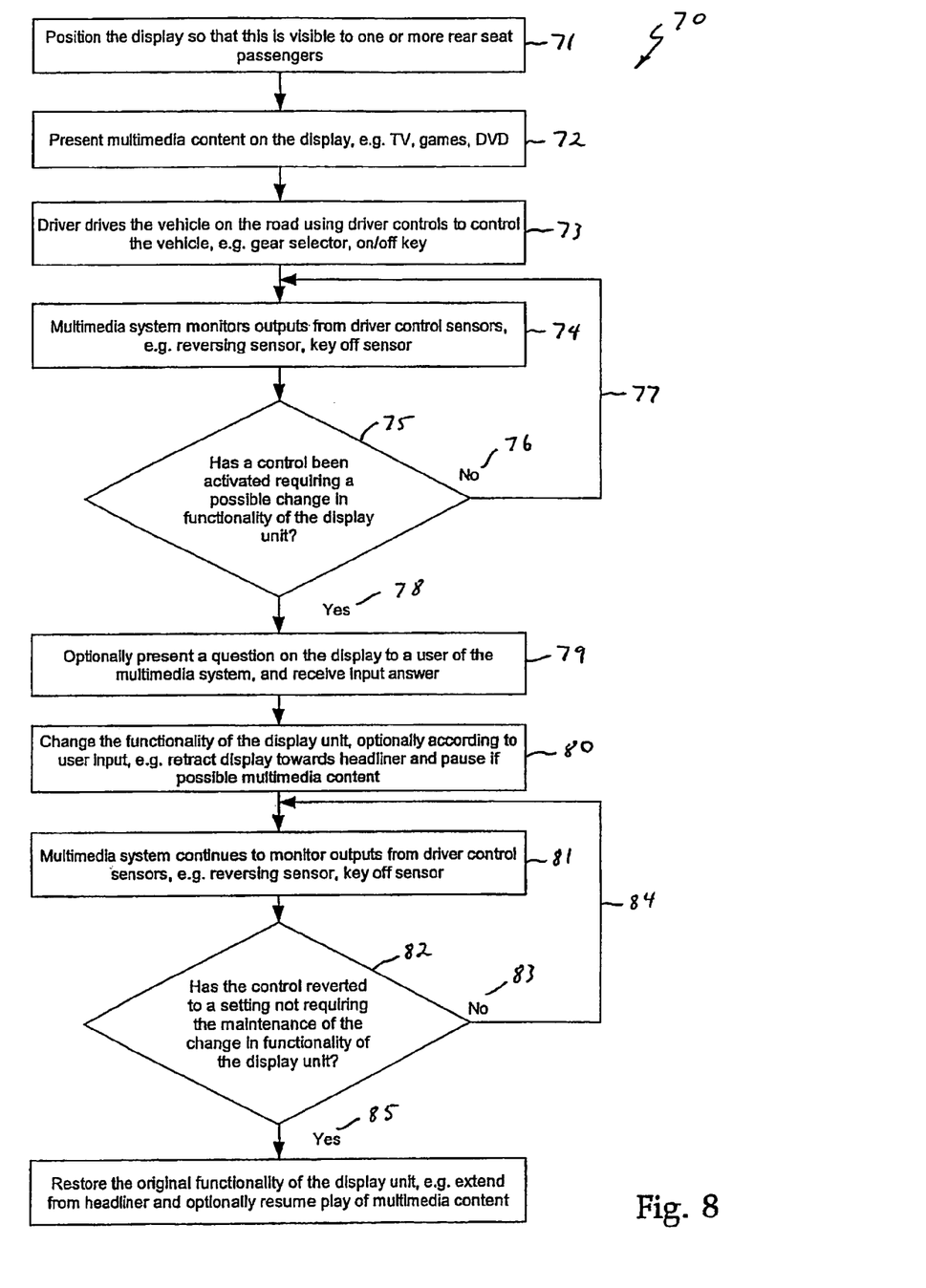
FIG. 8 is a flow diagram illustrating a method of operating a rear seat multimedia system in a motor vehicle, in a preferred embodiment of the invention.

FIG. 8 is a flow diagram 70 illustrating a method according to the invention or operating the rear seat multimedia system 2 in the motor vehicle 1. First, the display 12 is positioned (71), either manually or by means of the motor 26, so it this is visible to at least one occupant of the rear seat 14. The user may then select a multimedia source 44, 46, 47 to view and listen to which is presented to the rear seat occupant (72).

The driver drives (73) the vehicle 1 using various driver controls to control the operation of the vehicle. A component of the multimedia system for example the microprocessor 32, monitors (74) outputs 43, 44 from one or more driver control sensors, such as the reversing sensor 38 or key on/off sensor 41. A test is conducted (75) to establish if a driver control 10, 11 has been operated requiring a change in the functionality of the display unit 12. If not (76), then the monitoring of outputs(s) continues (77). If so (78), then optionally, a question or prompt 62 is presented (79) on the display 12, and an answer, if any, is received.

The functionality of at the display unit is then changed (80), optionally according to the user input. For example, the display 12 may remain powered on for a predetermined time period even thought the ignition key 11 is switched off 42, or the display 12 may be flipped up by the motor 26 into the housing recess 30 to improve the rearward driver visibility—either direct visibility or the field of view 16 in the rear view mirror 17.

The system, for example the microprocessor 32, continues to monitor (81) the or each output 43, 44 from corresponding driver control sensors 38, 41. A test is conducted (82) to establish if a driver control 10, 11 has been operated to a setting no longer requiring the maintenance of the previous change in the functionality of the display unit 12. If not (83), then the monitoring of output (s) continues (84). If so (85), then the original functionality of the display unit is restored, for example by extending the display 12 from the headliner 8 when reverse gear 40 is no longer selected, or by rescinding the predetermined time limit if the ignition switch 11 is switched to an on portion.

In summary, the rear seat multimedia system comprises in one embodiment a display unit mounted on a central portion of a passenger compartment headliner. The display is movable between an extended position in which the display extends downwardly from the headliner so that the display is viewable by one or more rear seat passengers, and a retracted position against the headliner. The display unit has a motor for moving the display at least from the extended position to the retracted position, and preferably also in the reverse direction. The vehicle has a reversing sensor for sensing a reversing condition when the vehicle is to be driven in reverse, and the display unit is operatively linked to this sensor so that when the display is extended and the reversing condition is sensed the motor automatically moves the display to the retracted position to improve rearward visibility for the driver. In another embodiment of the invention, the vehicle has an ignition on/off sensor, and the display unit is operatively linked to this sensor so that when the ignition is switched off, a message is presented to a user of the system asking if a viewing should continue for a predetermined time period. In both embodiment, the functionality of the multimedia system when being used by a passenger is responsive to the sensing of one of a plurality of discrete driver selection(s).

The invention therefore provides a more convenient multimedia system within a motor vehicle, in which the functionality of at least the video display of the multimedia system when being used by a passenger is responsive to the sensed driver control selection(s).

It is appreciated that certain features of the invention, which are, for clarity, described in the context of separate embodiments, may also be provided in combination in a single embodiment.

It also is to be recognized that various alterations, modifications, and/or additions may be introduced into the constructions and arrangements of parts described above without departing from the scope of the present invention, as defined by the appended claims.

The invention claimed is:

1. A motor vehicle, comprising at least one driver control having a setting selectable by a driver to drive the vehicle, at least one sensor configured to sense the selection of the setting of the driver control, a passenger multimedia system having display for at least one passenger, the multimedia system being operatively linked to the sensor, when being used by a passenger a functionality of the multimedia system is controlled in response to the sensed selection of the setting by the driver, wherein one driver control is a near selector having a reversing sensor for sensing the setting being a reversing condition when the vehicle is to be driven in reverse.

2. A motor vehicle as claimed in claim 1, wherein the functionality includes an automatic pause in use of the multimedia system by a passenger in response to the sensed selection of the setting.

3. A motor vehicle as claimed in claim 1, wherein the functionality includes, after the automatic pause, an automatic resume in use of the multimedia system by a passenger in response to a reversion in the sensed selection(s).

4. A motor vehicle as claimed in claim 1 wherein the display is provided on a central portion of a passenger compartment headline and movable between an extended position in which the display extends downwardly from the headliner so that the display is viewable by a rear seat passenger, and a retracted position in which the display is retracted upwards towards the headliner and in which the display is not viewable by the passenger, the display being movable by a motor from the extended position to the retracted position and the motor being operatively linked to the reversing sensor so that when the display is extended and the reversing condition is sensed the motor automatically moves the display to the retracted position.

5. A motor vehicle as claimed in claim 1, in which one driver control is a motor start/run control having a key off sensor for sensing the settling being a key off condition of the vehicle.

6. A motor vehicle as claimed in claim 5 wherein the display is provided on a central portion of a passenger compartment headliner and is movable between an extended position in which the display extends downwardly from the headliner so that the display is viewable by one or more rear seat passengers, and a retracted position in which the display is retracted upwards towards the headliner and in which the display is not viewable by the passenger, the display being movable by a motor from the extended position to the retracted position, the motor is operatively linked to the key off sensor so that when the display is extended and the key off condition is sensed the motor automatically moves the display to the retracted position.

7. A motor vehicle having a rear seat multimedia system, said system comprising a display unit mounted on a central portion of a passenger compartment headliner and having a display, the display being movable between an extended position in which the display extends downwardly from the headliner so that the display is viewable by one or more rear seat passengers, and a retracted position in which the display is retracted upwards towards the headliner and in which the display is not viewable by said passenger(s), the display unit having a motor for moving the display at least from the extended position to the retracted position, wherein:
the vehicle comprises a reversing sensor for sensing a reversing condition when the vehicle has selected a reverse gear; and
the display unit is operatively linked to said sensor so that when the display is extended and the reversing condition is sensed the motor automatically moves the display to the retracted position.

8. A motor vehicle as claimed in claim 7, wherein the vehicle comprises a gear selector with a reverse gear setting, said sensor being arranged to sense the setting of the gear selector.

9. A motor vehicle as claimed in claim 7, in which the display unit comprises a processor, the processor receiving a signal from the sensor and being configured to control operation of the motor in response to the signal.

10. A motor vehicle as claimed in claim 7, in which the multimedia system is arranged to send a pause play command to a multimedia source when the display is to be retracted in response to the sensing of the reversing condition.

11. A motor vehicle as claimed in claim 10, in which the multimedia system comprises a separate multimedia source, the multimedia system being linked to the multimedia source by means of a bidirectional communications link, the multimedia system sending the pause play command to the multimedia source over said communications link.

12. A motor vehicle as claimed in claim 7, in which the sensor is arranged to sense when a reversing condition no longer exists, the display unit being operatively linked to said sensor so that when the display has previously been retracted in response to a reversing condition, the motor automatically moves the display to the extended position.

13. A motor vehicle as claimed in claim 12, in which the multimedia system is arranged in response to the reversing condition no longer existing to send a resume play command to a multimedia source when the multimedia source has previously been paused in response to the sensed reversing condition.

14. A motor vehicle as claimed in claim 13, in which the multimedia system comprises a separate multimedia source, the multimedia system being linked to the multimedia source by means of a bidirectional communications link, the multimedia system sending said resume play command to the multimedia source over said communications link.

15. A motor vehicle as claimed in claim 7, in which the vehicle comprises a key off sensor for sensing a key off condition, and the display unit is operatively linked to the key off sensor so that when the display is extended and the key off condition is sensed the motor automatically moves the display to the retracted position.

16. A motor vehicle as claimed in claim 7, in which:
the multimedia system comprises a user input device;
the vehicle comprises a key off sensor for sensing a key off condition
the display unit is operatively linked to said key off sensor;
the multimedia system is arranged, when the multimedia unit is being used, to present to a user of the multimedia unit a message asking if the user wishes to continue using the multimedia unit; and
the multimedia system is arranged, in response to user input in the affirmative from the user input device, to automatically continue use during the key off condition.

17. A motor vehicle as claimed in claim 16, in which the automatically continued use during the key off condition is limited to a predetermined period of time.

18. A motor vehicle as claimed in claim 16, in which:
the multimedia system is arranged, in response to user input in the negative, to present to a user of the multimedia unit a message asking if the user wishes to pause a multimedia source; and
the multimedia system is arranged in response to user input in the affirmative from the user input device to send a pause play command to said multimedia source.

19. A method of operating a passenger multimedia system in a motor vehicle, said system comprising a passenger-only display unit and said vehicle comprising a number of driver controls having a setting used by a driver to drive the vehicle and at least associated one driver control sensor, the method comprising the steps of:
presenting multimedia content on the display;
using the driver controls to control the road operation of the vehicle;
using said at least one driver control sensor to sense at least one driver selection of the driver controls; and
providing an output derived from said at least one sensor to the multimedia system in order to automatically control the way in which at least a video aspect of said multimedia content is presented to a passenger of the vehicle.

20. A method as claimed in claim 19, in which the display is movable and the method comprises the step of initially positioning the display so that the display would be visible to a passenger of the vehicle.

* * * * *

UNITED STATES PATENT AND TRADEMARK OFFICE
CERTIFICATE OF CORRECTION

PATENT NO. : 7,571,038 B2  
APPLICATION NO. : 11/358848  
DATED : August 4, 2009  
INVENTOR(S) : Nick Butler et al.

Page 1 of 1

It is certified that error appears in the above-identified patent and that said Letters Patent is hereby corrected as shown below:

In the Claims

In column 7, claim 1, line 54, after "driver control is a" replace "near" with --gear--.

Signed and Sealed this

Twenty-second Day of December, 2009

David J. Kappos  
*Director of the United States Patent and Trademark Office*